United States Patent
Noguchi et al.

(10) Patent No.: US 6,813,386 B2
(45) Date of Patent: Nov. 2, 2004

(54) METHOD OF AND APPARATUS FOR CALCULATING BINARY-CODING THRESHOLD VALUE

(75) Inventors: Yoshifumi Noguchi, Amimachi (JP); Xiong Jianmin, Amimachi (JP)

(73) Assignee: Riso Kagaku Corporation, Tokyo (JP)

( * ) Notice: Subject to any disclaimer, the term of this patent is extended or adjusted under 35 U.S.C. 154(b) by 624 days.

(21) Appl. No.: 09/754,307

(22) Filed: Jan. 5, 2001

(65) Prior Publication Data

US 2001/0007596 A1 Jul. 12, 2001

(30) Foreign Application Priority Data

Jan. 7, 2000 (JP) ........................................ 2000-001360

(51) Int. Cl.⁷ ............................ G06K 9/36; G06K 9/46
(52) U.S. Cl. ...................................... 382/237; 382/172
(58) Field of Search ................................ 382/237, 168, 382/169, 180, 170, 270, 172, 266, 273; 358/1.9, 2.99, 3.02, 3.13, 521, 522

(56) References Cited

U.S. PATENT DOCUMENTS

| | | | | |
|---|---|---|---|---|
| 4,837,450 A | | 6/1989 | Satomura et al. | |
| 4,905,294 A | * | 2/1990 | Sugiura et al. | 382/180 |
| 5,150,223 A | | 9/1992 | Telle | |
| 5,177,602 A | * | 1/1993 | Fujimori | 358/522 |
| 5,212,741 A | * | 5/1993 | Barski et al. | 382/156 |
| 5,608,823 A | * | 3/1997 | Ohtani | 382/271 |
| 5,617,484 A | * | 4/1997 | Wada et al. | 382/172 |
| 5,751,848 A | | 5/1998 | Farrell | |
| 5,774,578 A | * | 6/1998 | Shimizu | 382/170 |
| 5,805,723 A | * | 9/1998 | Fujiwara | 382/172 |
| 5,920,655 A | * | 7/1999 | Makita et al. | 382/272 |
| 6,018,589 A | * | 1/2000 | Hyodo | 382/168 |
| 6,043,900 A | * | 3/2000 | Feng et al. | 358/1.9 |
| 6,069,974 A | * | 5/2000 | Tsukada et al. | 382/170 |
| 6,198,845 B1 | * | 3/2001 | Tse et al. | 382/169 |
| 6,236,751 B1 | * | 5/2001 | Farrell | 382/168 |
| 6,347,256 B1 | * | 2/2002 | Smirnov et al. | 700/100 |
| 6,389,162 B2 | * | 5/2002 | Maeda | 382/172 |

* cited by examiner

*Primary Examiner*—Kanji Patel
(74) *Attorney, Agent, or Firm*—Nixon Peabody LLP; Donald R. Studebaker

(57) ABSTRACT

An image signal read out from an original is binary-coded on the basis of a binary-coding threshold value. The binary-coding threshold value is calculated by making a histogram representing a frequency distribution of tones of the image signal, calculating the value of a peak tone at which the frequency is maximized, calculating as a first tone at which the frequency becomes equal to a predetermined level on the lower tone side of the peak tone, calculating a reference binary-coding threshold value by adding to the peak tone the difference between the first tone and the peak tone, and determining the binary-coding threshold value on the basis of the reference binary-coding threshold value.

14 Claims, 13 Drawing Sheets

METHOD OF AND APPARATUS FOR CALCULATING BINARY-CODING THRESHOLD VALUE

BACKGROUND OF THE INVENTION

1. Field of the Invention

This invention relates to a method of and an apparatus for calculating a binary-coding threshold value on the basis of which an image signal obtained by an image input apparatus such as an image scanner is binary-coded when the image represented by the image signal is to be printed by, for instance, a stencil printer.

2. Description of the Related Art

The stencil printer has been wide used since it is short in printing time and low in cost. In the stencil printer, image processing and pixel value conversion processing are carried out on an image signal representing an image read by an image reader and the processed image signal is binary-coded, thereby obtaining a binary-coded image signal. Then a thermal head having an array of heater elements is driven on the basis of the binary-coded image signal so that the heater elements are selectively energized to imagewise perforate a stencil material, thereby obtaining a stencil. Printing is made by transferring ink from one side of the stencil to the other side through the perforations.

As a method of binary-coding the image signal, a method in which a single binary-coding threshold value is employed, for instance, when the image signal is of 256 tones, 0 to 255, the middle value 127 is taken as a binary-coding threshold value and tones equal to or higher than 127 are converted to 1 (black) while those lower than 127 are converted to 0 (white), has been wide used. However, the method in which a single binary-coding threshold value is employed is disadvantageous in that when the background of an original is high in density like a newspaper, the threshold value becomes too low and as a result, the binary-coded image represented by the binary-coded image signal becomes dark in total, which makes characters hard to read.

Accordingly, there have been proposed various methods of calculating the binary-coding threshold value including a mean value method and a P-tile method. In the mean value method, a mean value of the densities in a predetermined region of the original or in the entire region of the original is taken as a binary-coding threshold value, and in the P-tile method, a density distribution in a predetermined region of the original is obtained and the density which will make black P% of the predetermined region when the image signal is binary-coded with the density taken as the threshold value is taken as the binary-coding threshold value.

However, the mean value method gives rise to a problem that the threshold value becomes too high and the density of the binary-coded image is lowered when the original includes noise or an image on the back side of the original is seen through the paper. The P-tile method gives rise to a problem that when the original includes a region which is different in density and size of characters from the region which is used to obtain the binary-coding threshold value, the density of the region can be increased or reduced.

SUMMARY OF THE INVENTION

In view of the foregoing observations and description, the primary object of the present invention is to provide a method of and an apparatus for calculating a binary-coding threshold value which can properly calculate the binary-coding threshold value.

In accordance with a first aspect of the present invention, there is provided a method of calculating a binary-coding threshold value on the basis of which an image signal is binary-coded, the method comprising the steps of making a histogram representing a frequency distribution of tones of the image signal, calculating the value of a peak tone at which the frequency is maximized, calculating as a first tone at which the frequency becomes equal to a predetermined level on the lower tone side of the peak tone, calculating a reference binary-coding threshold value by adding to the peak tone the difference between the first tone and the peak tone, and determining the binary-coding threshold value on the basis of the reference binary-coding threshold value.

The peak tone generally corresponds to a peak of frequency in the histogram. When there are plurality of peaks of frequency, the tone corresponding to the highest peak is taken as the peak tone.

The "predetermined level" is a frequency level which is determined on the basis of histograms for image signals read out from various originals so that the frequency at the peak tone of the histogram is higher than the "predetermined level" for substantially all the image signals.

The expression "determining the binary-coding threshold value on the basis of the reference binary-coding threshold value" means to determines the binary-coding threshold value, for instance, in the following manner. That is, a plurality of binary-coding threshold values are set for each given reference binary-coding threshold value and the image signal S is binary-coded on the basis of the respective binary-coding threshold values and printing is made on the basis of the binary-coded image signal. Then the binary-coding threshold value which gives a print of the highest quality is taken as the binary-coding threshold value for the reference binary-coding threshold value. This procedure is repeated for each value of the reference binary-coding threshold value and the reference binary-coding threshold value is related to the binary-coding threshold value as a table. Then the binary-coding threshold value for a given reference binary-coding threshold value is determined according to the table.

It is preferred that when the sum of the frequencies at tones higher than a predetermined low value is higher than the sum of the frequencies at tones not higher than the predetermined low value, the tone at which the frequency becomes equal to the predetermined level on the higher tone side of the peak tone be taken as the reference binary-coding threshold value.

For example, the predetermined low value is set to a tone at the peak of a histogram made on the basis of an image signal read from a white reference original. For example, when the area of the background of the original is very large and the background is very white, the sum of the frequencies at tones lower than a predetermined low value is higher than the sum of the frequencies at tones not lower than the predetermined low value.

It is preferred that when the frequency at the peak tone is lower than the predetermined level, when the sum of the frequencies at tones higher than a predetermined high value is higher than the sum of the frequencies at tones not higher than the predetermined high value, and/or when at least one of the peak tone, the first tone and the reference binary-coding threshold value is higher than the predetermined high value, the reference binary-coding threshold value be set to a predetermined tone.

For example, the predetermined high value is set to a tone at the peak of a histogram made on the basis of an image signal read from a black reference original. That the frequency at the peak tone is lower than the predetermined level means that no peak exists in the histogram or that the frequency at the peak tone is very low. For example, when the area of characters and/or drawings of the original is very large or the density of the background is very high, the sum of the frequencies at tones lower than a predetermined high value is higher than the sum of the frequencies at tones not lower than the predetermined high value, or at least one of the peak tone, the first tone and the reference binary-coding threshold value is higher than the predetermined high value.

In accordance with a second aspect of the present invention, there is provided an apparatus for calculating a binary-coding threshold value on the basis of which an image signal is binary-coded, the apparatus comprising a histogram making means which makes a histogram representing a frequency distribution of tones of the image signal, a peak tone calculating means which calculates the value of a peak tone at which the frequency is maximized, a first tone calculating means which calculates as a first tone at which the frequency becomes equal to a predetermined level on the lower tone side of the peak tone, a reference binary-coding threshold value calculating means which calculates a reference binary-coding threshold value by adding to the peak tone the difference between the first tone and the peak tone, and a binary-coding threshold value determining means which determines the binary-coding threshold value on the basis of the reference binary-coding threshold value.

It is preferred that the reference binary-coding threshold value calculating means be provided with a determining means which determines whether the sum of the frequencies at tones higher than a predetermined low value is higher than the sum of the frequencies at tones not higher than the predetermined low value, and takes the tone at which the frequency becomes equal to the predetermined level on the higher tone side of the peak tone as the reference binary-coding threshold value when the determining means determines that the sum of the frequencies at tones higher than a predetermined low value is higher than the sum of the frequencies at tones not higher than the predetermined low value.

It is preferred that the reference binary-coding threshold value calculating means be provided with a determining means which determines whether the frequency at the peak tone is lower than the predetermined level, whether the sum of the frequencies at tones higher than a predetermined high value is higher than the sum of the frequencies at tones not higher than the predetermined high value, and whether at least one of the peak tone, the first tone and the reference binary-coding threshold value is higher than the predetermined high value, and sets the reference binary-coding threshold value to a predetermined tone when the determining means determines that the frequency at the peak tone is lower than the predetermined level, that the sum of the frequencies at tones higher than a predetermined high value is higher than the sum of the frequencies at tones not higher than the predetermined high value, or that at least one of the peak tone, the first tone and the reference binary-coding threshold value is higher than the predetermined high value.

In a histogram representing a frequency distribution of tones of an image signal, tones representing the background of the original appear most frequently except the case where the image signal is read out from an original which is entirely black or white. Accordingly, the peak tone represents tones of the background of the original. The first tone represents the lowest tone of the background of the original. Further, the histogram for an original without characters or drawings (an original having only a background) is generally symmetric about the peak tone. Accordingly, the reference binary-coding threshold value obtained by adding to the peak tone the difference between the first tone and the peak tone is substantially equal to the highest tone of the background of the original without characters or drawings (an original having only a background). Accordingly, when the binary-coding threshold value is determined on the basis of the reference binary-coding threshold value and the image signal is binary-coded on the basis of the binary-coding threshold value thus obtained, a binary-coded image signal in which the background is clearly separated from characters and drawings can be obtained.

DESCRIPTION OF THE PREFERRED EMBODIMENT

Figure 1:
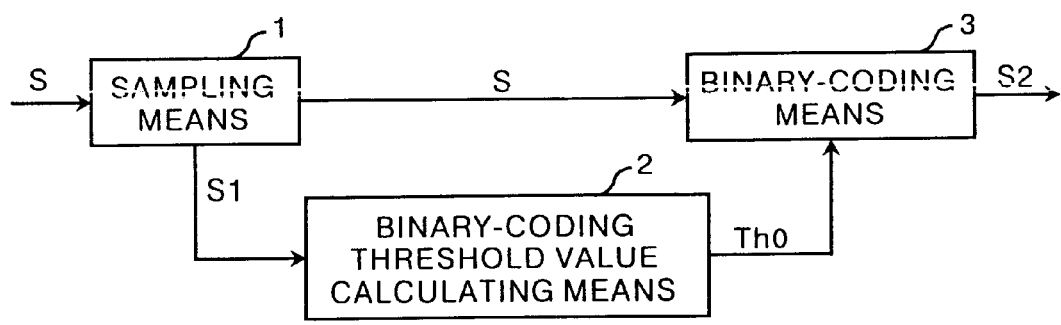
FIG. 1 is schematic block diagram showing a binary-coding apparatus employing a binary-coding threshold value calculating apparatus in accordance with an embodiment of the present invention.

FIG. 1 shows a binary-coding apparatus employing a binary-coding threshold value calculating apparatus in accordance with an embodiment of the present invention. As shown in FIG. 1, the binary-coding apparatus comprises a sampling means 1 which extracts sample data S1 from an image signal (image data) S read out from an original, a binary-coding threshold value calculating means 2 which calculates a binary-coding threshold value Th0 on the basis of the sample data S1, and a binary-coding means 3 which binary-codes the image signal S on the basis of the binary-coding threshold value Th0 and obtains a binary-coded image signal S2.

Figure 2:
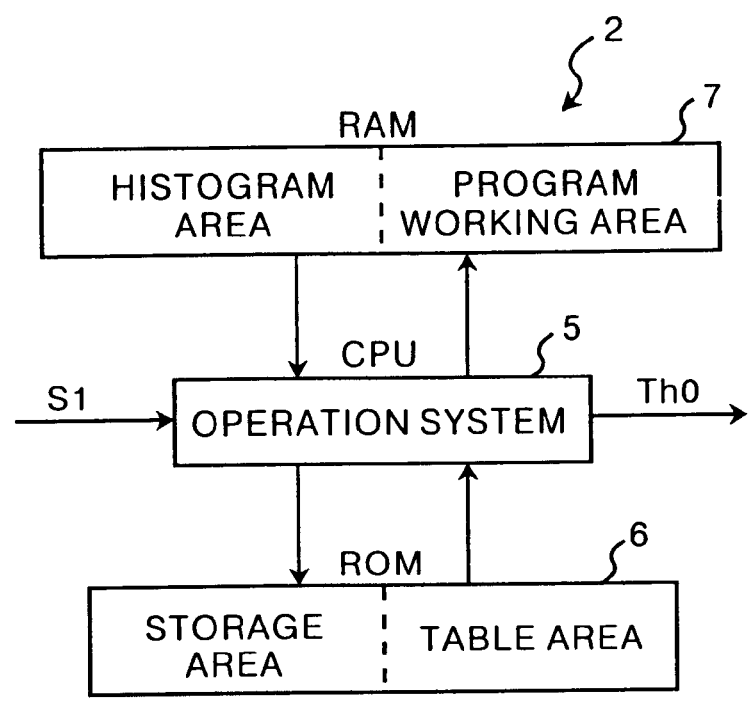
FIG. 2 is a schematic block diagram showing the structure of the binary-coding threshold value calculating apparatus.

FIG. 2 shows the structure of the binary-coding threshold value calculating means 2. As shown in FIG. 2, the binary-coding threshold value calculating means 2 comprises an operation system (CPU) 5 which carries out operation for obtaining the binary-coding threshold value Th0, a ROM 6 which is provided with a storage area for storing program executed by the operation system 5 and with a binary-coding threshold value correcting table area for correcting the calculated binary-coding threshold value to be described later, and a RAM 7 which is provided with a histogram area for storing a histogram made to be described later and with a program working area. In this particular embodiment, the image signal has 256 tones, from 0 to 255.

Figure 3:
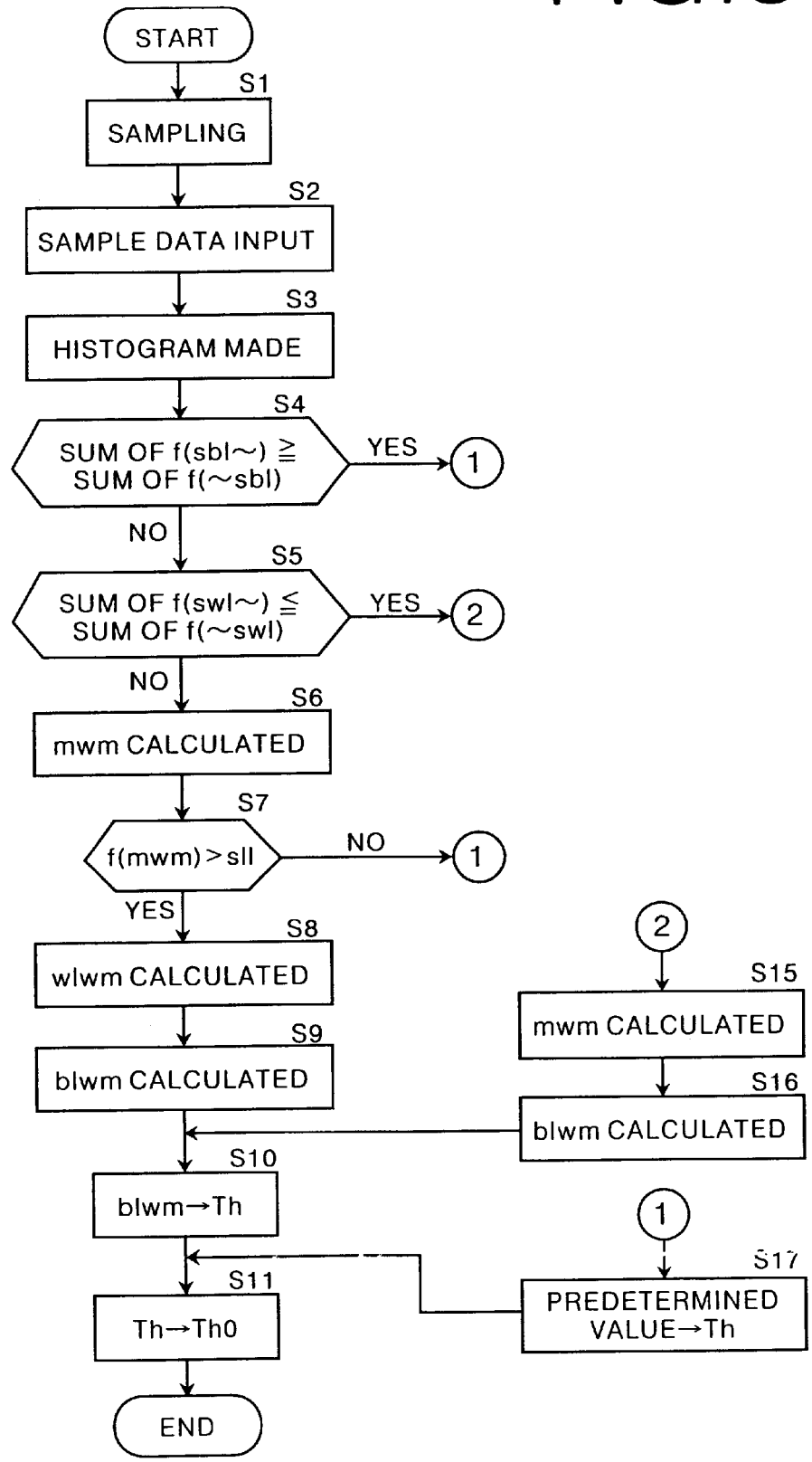
FIG. 3 is a flow chart for illustrating operation of the binary-coding threshold value calculating apparatus.

Operation of the binary-coding apparatus of this embodiment will be described with reference to the flow chart shown in FIG. 3, hereinbelow. When an image signal S, which is obtained, for instance, by reading an original, is input, a sample data S1 is sampled from the image signal S1. For example, the sample data S1 may be obtained by thinning the image signal S. (step S1) The reason the sample data S1 is sampled is to shorten the operation time required for the binary-coding threshold value calculating means 2 to calculate the binary-coding threshold value Th0. The sample data S1 is input into the binary-coding threshold value calculating means 2. (step S2)

Figure 4:
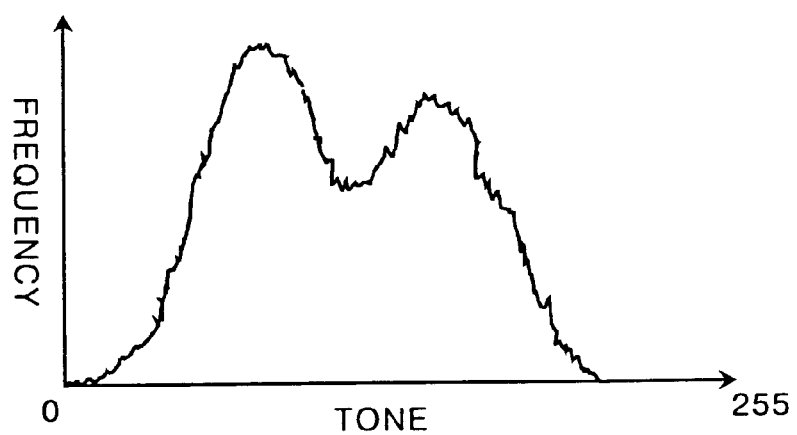
FIG. 4 is a view showing a histogram before the smoothing processing.
Figure 5:
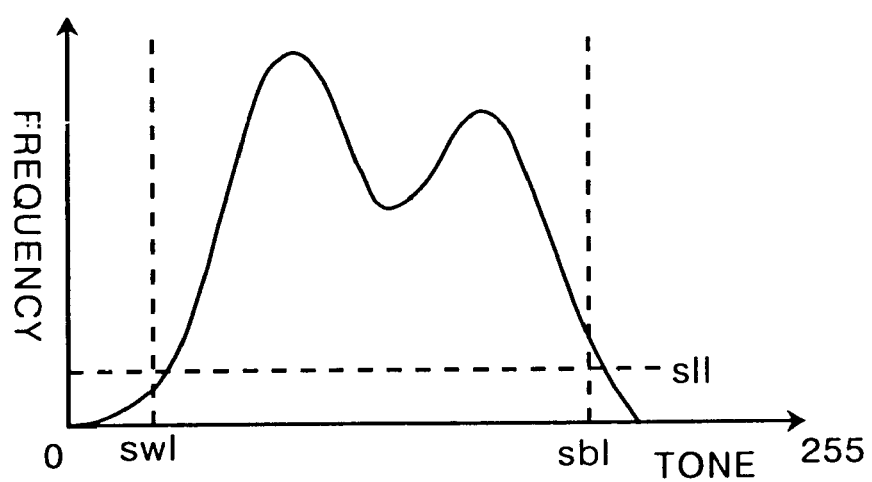
FIG. 5 is a view showing a histogram after the smoothing processing.
Figure 6:
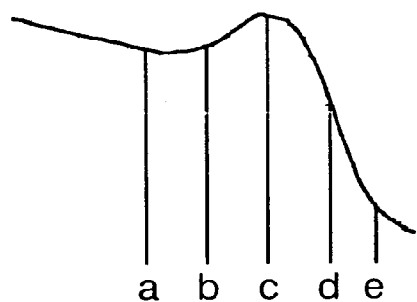
FIG. 6 is a view for illustrating the smoothing processing.

The binary-coding threshold value calculating means 2 makes a histogram representing a frequency distribution of tones of the sample data S1. (step S3) For example, a histogram shown in FIG. 4 is made for the sample data S1. In this particular embodiment, the histogram shown in FIG. 4 is smoothed into a histogram shown in FIG. 5, and the smoothed histogram shown in FIG. 5 is employed. The smoothing processing will be described with reference to FIG. 6. When it is assumed that the sample data S1 has 5 tones (a to e) as shown in FIG. 6, for instance, tone b is converted to (a+b+c+d)/4 or (a+b+c)/3 and tone c is converted to (b+c+d+e)/4 or (b+c+d)/3. By converting all the tones in this manner, the histogram is smoothed.

As shown in FIG. 5, three values, swl (Super White Level), sbl (Super Black Level) and sll (Super Low Level), are set in the histogram shown in FIG. 5. The super white level swl is set to a tone at the peak of a histogram made on the basis of an image signal read from, for instance, a white reference original. The super black level sbl is set to a tone at the peak of a histogram made on the basis of an image signal read from, for instance, a black reference original. The super low level Sll is a frequency level which is determined on the basis of histograms for image signals read out from various originals so that the frequency at the peak tone of the histogram is higher than the super low level Sll for substantially all the image signals.

Figure 7:
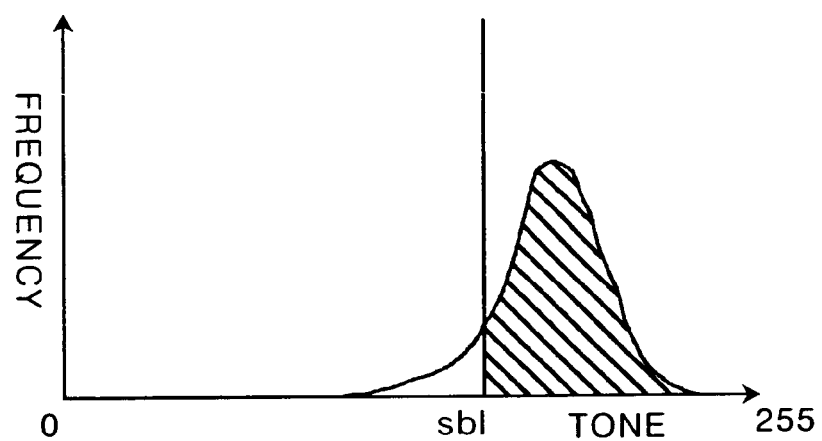
FIG. 7 is a view showing a particular histogram.

Then it is determined whether the sum of the frequencies at tones not lower than the super black level sbl (f(sbl~)) is higher than the sum of the frequencies at tones lower than the super black level sbl (f(~sbl)). (step S4) That is, the case where the former is higher than the latter is a case where the histogram is as shown in FIG. 7 and the area of the hatched portion is higher than the non-hatched portion. In such a case, the area of characters and/or drawings of the original is very large or the density of the background is very high and it is impossible to properly determine the binary-coding threshold value. Accordingly, when it is determined in step S4 that the sum of the frequencies at tones not lower than the super black level sbl is higher than the sum of the frequencies at tones lower than the super black level sbl, a predetermined value is set as a reference binary-coding threshold value Th to be described later. (step S17).

Figure 8:
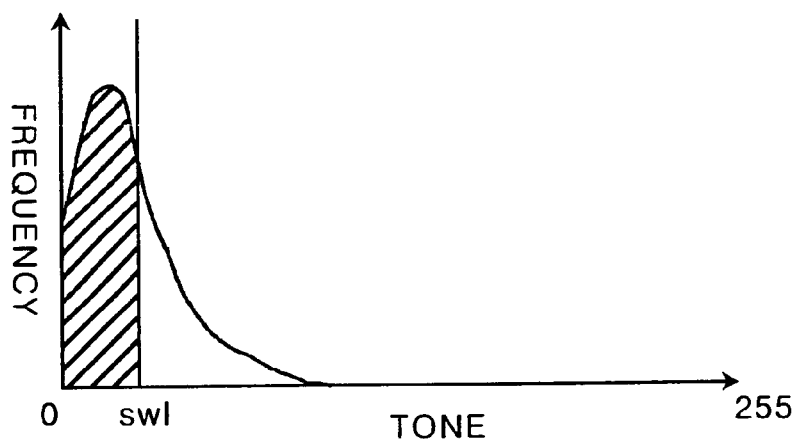
FIG. 8 is a view showing another particular histogram.

On the other hand, when it is determined in step S4 that the sum of the frequencies at tones not lower than the super black level sbl is not higher than the sum of the frequencies at tones lower than the super black level sbl, it is determined whether the sum of the frequencies at tones lower than the super white level swl (f(swl~)) is higher than the sum of the frequencies at tones not lower than the super white level swl (f(~swl)). (step S5) That is, the case where the former is higher than the latter is a case where the histogram is as shown in FIG. 8 and the area of the hatched portion is higher than the non-hatched portion. In such a case, the area of the background of the original is very large or the density of the background is very low and it is impossible to properly determine the binary-coding threshold value. Accordingly, when it is determined in step S5 that the sum of the frequencies at tones lower than the super white level swl is higher than the sum of the frequencies at tones not lower than the super white level swl, a reference binary-coding threshold value Th is determined in a manner to be described later. (step S15).

Figure 9A:
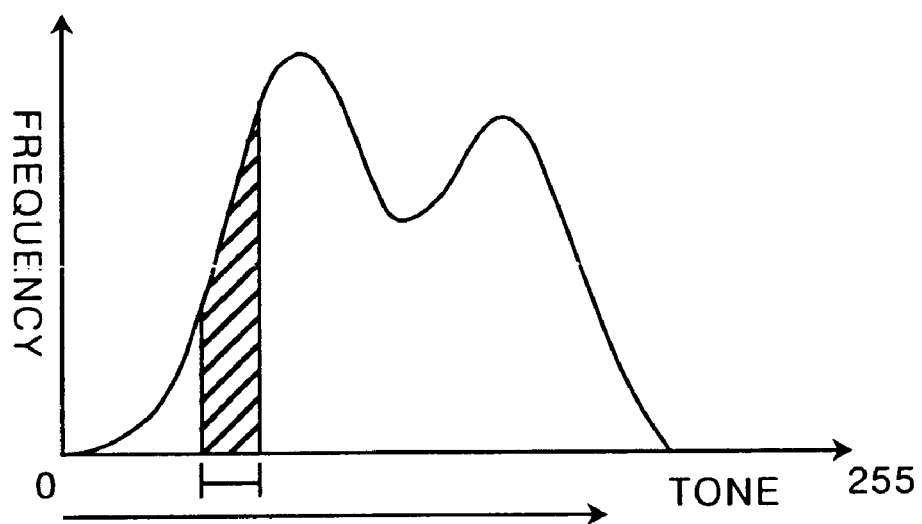
FIGS. 9A and 9B are views for illustrating the method of calculating the peak tone.
Figure 9B:
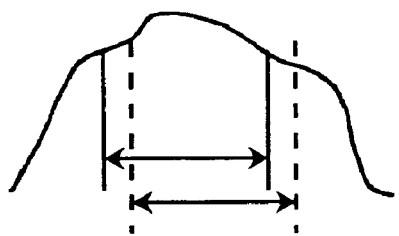

When it is determined in step S5 that the sum of the frequencies at tones lower than the super white level swl is not higher than the sum of the frequencies at tones not lower than the super white level swl, the peak tone at which the frequency is maximized is calculated. (step S6) A method of calculating the peak tone will be described with reference to FIGS. 9A and 9B. As shown in FIG. 9A, the sum of the frequencies at tones in a tone band of a predetermined tone width (e.g., a width of 7 to 13 tones in the case where the image signal is of 256 tones as in this embodiment) is calculated as shown in FIG. 9A with the tone band shifted one tone by one tone from the lowest tone toward the highest tone as shown in FIG. 9B. Then the tone band at which the sum of the frequencies is maximized is determined and the tone at the middle of the tone band is taken as the peak tone or the mid of white mountain (mwm). For example when the predetermined tone width is 9 and the tone band at which the sum of the frequencies is maximized is 41 to 49, the peak tone or the mid of white mountain (mwm) is 45. The peak tone or the mwm thus determined is a representative of the tones of the background of the original.

Then it is determined whether the frequency f(mwm) at the mid of white mountain (mwm) is higher than the super low level sll. (step S7) That the frequency f(mwm) at the mid of white mountain (mwm) is not higher than the super low level sll means that no peak exists in the histogram or that the frequency at the peak tone is very low. In such a case, it is impossible to determine a binary-coding threshold value on the basis of which the background part of the original can be clearly separated from the image part of the original. Accordingly, when it is determined in step S7 that the frequency f(mwm) at the mid of white mountain (mwm) is not higher than the super low level sll, a predetermined value is set as the reference binary-coding threshold value Th. (step S17). On the other hand, when it is determined in step S7 that the frequency f(mwm) at the mid of white mountain (mwm) is higher than the super low level sll, the tone at which the frequency becomes equal to the super low level sll on the lower tone side of the mid of white mountain (mwm), that is, the tone at which the line f=sll intersects the histogram on the lower tone side of the mid of white mountain (mwm), is taken as the white limit of white mountain wlwm. (step S8) The white limit of white mountain wlwm represents the lower limit on the histogram of the background of the original.

Figure 10:
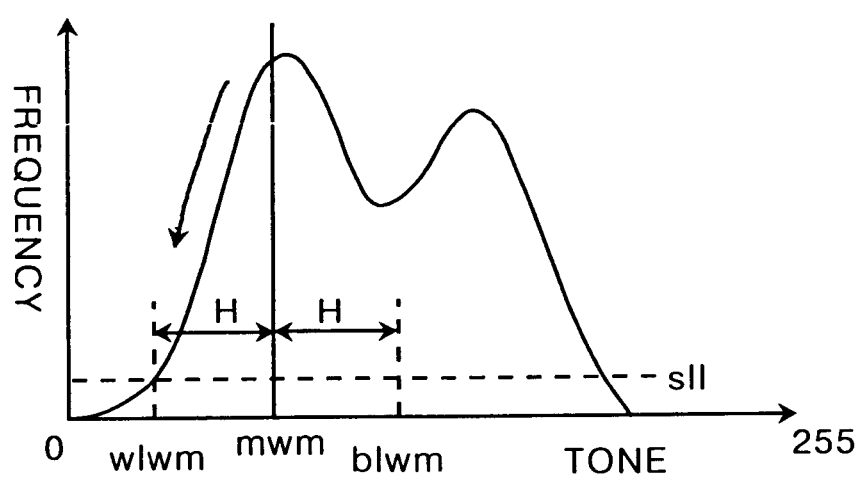
FIG. 10 is a view for illustrating a method of calculating the white limit of white mountain wlwm and the black limit of white mountain blwm.
Figure 11:
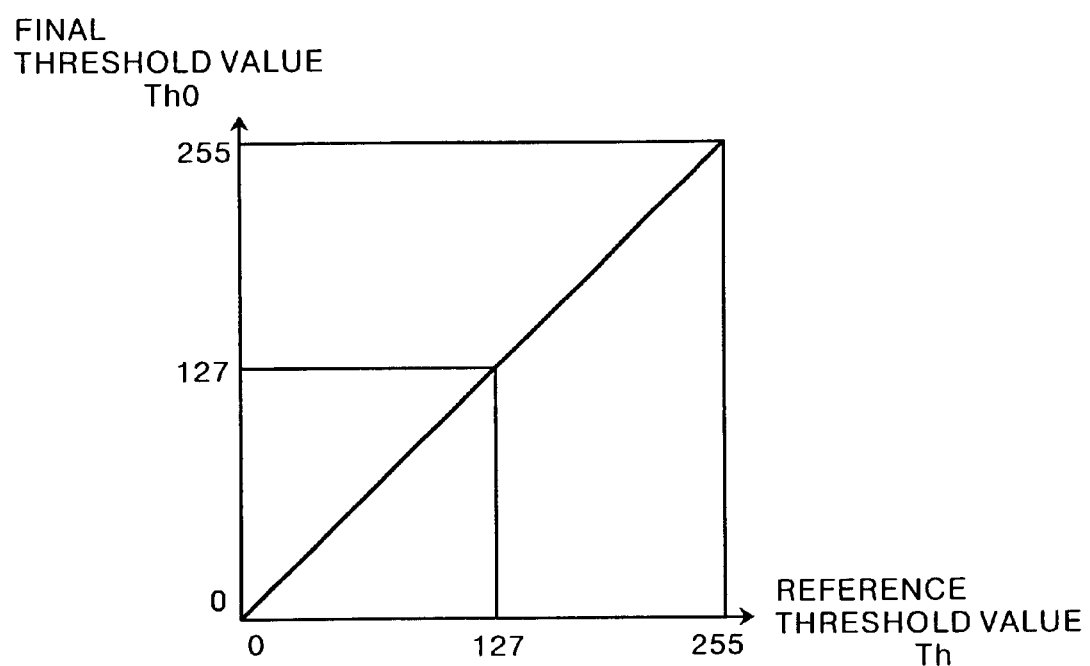
FIG. 11 is a view showing the basic conversion table.
Figure 12:
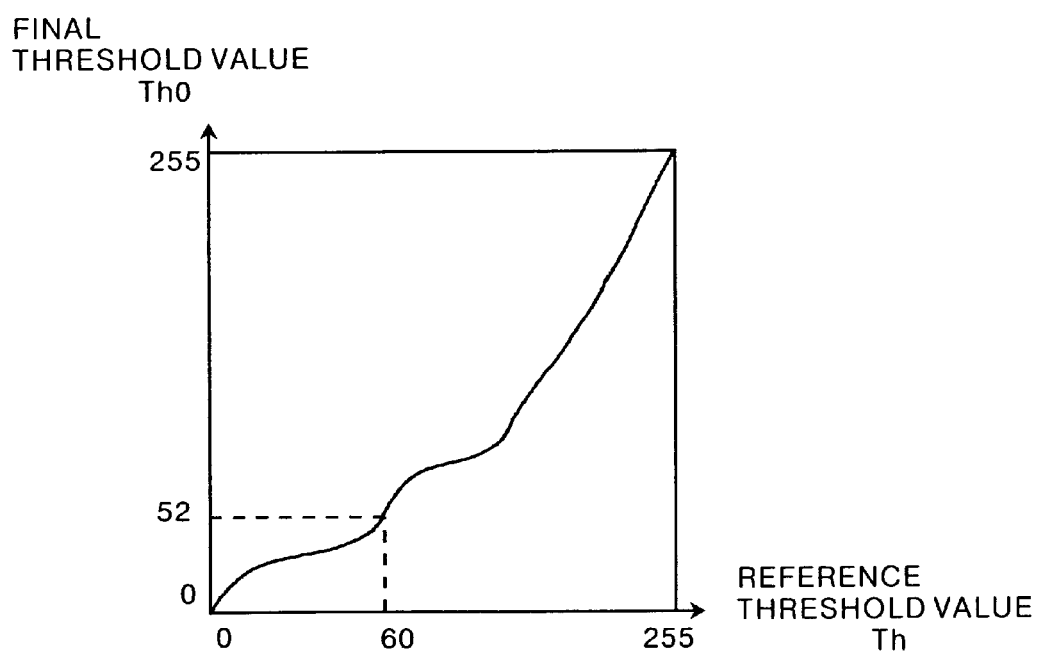
FIG. 12 is a view showing the corrected conversion table.

Thereafter, the difference H (FIG. 10) between the mid of white mountain mwm and the white limit of white mountain wlwm is calculated and added to the mid of white mountain mwm, whereby the black limit of white mountain blwm is obtained and the black limit of white mountain blwm is taken as the reference binary-coding threshold value Th. (step S9) Since the histogram is generally symmetrical, the value obtained by adding the difference H between the mid of white mountain mwm and the white limit of white mountain wlwm to the mid of white mountain mwm represents the upper limit on the histogram of the background of the original. Then the black limit of white mountain blwm is taken as the reference binary-coding threshold value Th (step S10), and the reference binary-coding threshold value Th is converted to a final binary-coding threshold value Th0 according to a conversion table shown in FIG. 12. For example, when the reference binary-coding threshold value Th is 60, the value of the final binary-coding threshold value Th0 is set to 52. The conversion table is basically as shown in FIG. 11 and is corrected to that shown in FIG. 12 in the following manner. That is, a plurality of final binary-coding threshold values Th0 are set for each given reference binary-coding threshold value Th and the image signal S is binary-coded on the basis of the respective final binary-coding threshold values and printing is made on the basis of the binary-coded image signal. Then the final binary-coding threshold value Th0 which gives a print of the highest quality is taken as the final binary-coding threshold value for the reference binary-coding threshold value. This procedure is repeated for each value of the reference binary-coding threshold value and the corrected conversion table shown in FIG. 12 is obtained.

The binary-coding means 3 binary-codes the image signal S on the basis of the final binary-coding threshold value Th0 is thus determined and printing is made on the basis of the binary-coded image signal.

Figure 13:
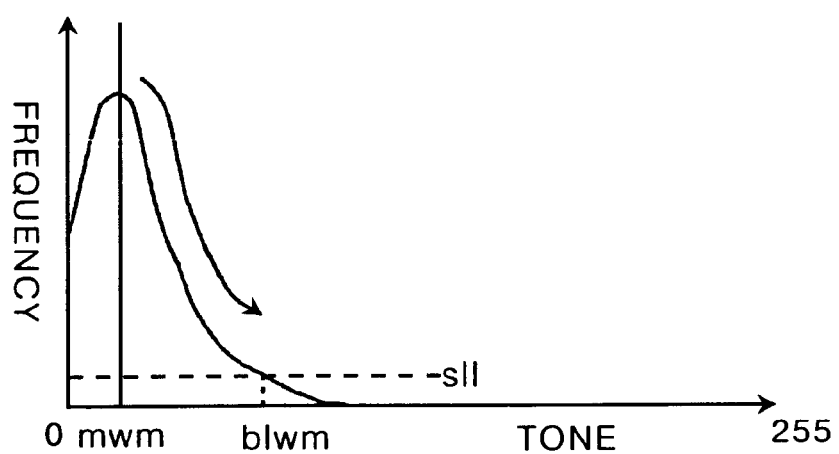
FIG. 13 is a view showing a method of calculating the black limit of white mountain blwm.

When it is determined in step S5 that the sum of the frequencies at tones lower than the super white level swl is higher than the sum of the frequencies at tones not lower than the super white level swl, the value of the white limit of white mountain wlwm cannot be obtained since the histogram is as shown in FIG. 8. In such a case, the peak tone mwm is calculated in the same manner as in step S6, and the tone at which the frequency becomes equal to the super low level sll on the higher tone side of the mid of white mountain (mwm), that is, the tone at which the line f=sll intersects the histogram on the higher tone side of the mid of white mountain (mwm), is taken as the black limit of white mountain blwm as shown in FIG. 13. (step S16) Then in step S10, the black limit of white mountain blwm is taken as the reference binary-coding threshold value Th.

As can be seen from the description above, in this embodiment, since the tone of the high density side limit of the background of the original is taken as a reference binary-coding threshold value Th and the final binary-coding threshold value Th0 on the basis of which the image signal S is actually binary-coded is obtained on the basis of the reference binary-coding threshold value Th, the background of the original can be clearly separated from the characters and the drawings on the original, whereby prints of high quality can be obtained.

In addition, all of the contents of Japanese Patent Application No. 2000-1360 are incorporated into this specification by reference.

What is claimed is:

1. A method of calculating a binary-coding threshold value on the basis of which an image signal is binary coded, the method comprising the steps of:

making a histogram representing a frequency distribution of tones of the image signal;

determining a value of a peak tone at which the frequency is maximized;

determining a value of a first tone by selecting a tone in the histogram at a point where the frequency becomes equal to a predetermined level on the lower tone side of the peak tone, and determining the binary-coding threshold value on the basis of the peak tone and the difference between the first tone and the peak tone, wherein the threshold value is set on the upper tone side of said peak tone.

2. A method as defined in claim 1 in which a reference binary-coding threshold value is determined by adding to the peak tone a value substantially corresponding to the difference between the first tone and the peak tone, and the binary-coding threshold value is determined on the basis of the reference binary-coding threshold value.

3. A method as defined in claim 2 in which the binary-coding threshold value is determined according to a reference binary-coding threshold value versus binary-coding threshold value conversion table which has been empirically determined.

4. A method, as defined in claim 2 in which when the sum of the frequencies at tones lower than a predetermined low value is higher than the sum of the frequencies at tones not lower than the predetermined low value, the tone at which the frequency becomes equal to the predetermined level on the higher tone side of the peak tone is taken as the reference binary-coding threshold value.

5. A method as defined in claim 4 in which when the frequency at the peak tone is lower than the predetermined level, when the sum of the frequencies at tones higher than a predetermined high value is higher than the sum of the frequencies at tones not higher than the predetermined high value, or when at least one of the peak tone, the first tone and the reference binary-coding threshold value is higher than the predetermined high value, the reference binary coding threshold value be set to a predetermined tone.

6. A method as defined in claim 2 in which when the frequency at the peak tone is lower than the predetermined level, when the sum of the frequencies at tones higher than a predetermined high value is higher than the sum of the frequencies at tones not higher than the predetermined high value, or when at least one of the peak tone, the first tone and the reference binary-coding threshold value is higher than the predetermined high value, the reference binary-coding threshold value be set to a predetermined tone.

7. An apparatus for calculating a binary-coding threshold value on the basis of which an image signal is binary-coded, the apparatus comprising:

a histogram making means which makes a histogram representing a frequency distribution of tones of the image signal, a peak tone determining means which calculates the value of a peak tone at which the frequency is maximized, a first tone determining means which determines the value of a first tone by selecting a tone in the histogram at a point when the frequency becomes equal to a predetermined level on the lower tone side of the peak tone, and a binary-coding threshold value determining means which determines the binary-coding threshold value on the basis of the peak tone and the difference between the first tone and the peak tone, wherein the threshold value is set on the upper tone side of said peak tone.

8. An apparatus as defined in claim 7 in which the binary-coding threshold value determining means determines a reference binary-coding threshold value by adding to the peak tone a value substantially corresponding to the difference between the first tone and the peak tone, and determines the binary-coding threshold value on the basis of the reference binary-coding threshold value.

9. An apparatus as defined in claim 8 in which in the binary-coding threshold value determining means determines the binary-coding threshold value according to a reference binary-coding threshold value versus binary-coding threshold value conversion table which has been empirically determined.

10. An apparatus as defined in claim 8 in which the reference binary-coding threshold value calculating means is provided with a determining means which determines whether the sum of the frequencies at tones lower than a predetermined low value is higher than the sum of the frequencies at tones not lower than the predetermined low value, and takes the tone at which the frequency becomes equal to the predetermined level on the higher tone side of the peak tone as the reference binary-coding threshold value when the determining means determines that the sum of the frequencies at tones lower than a predetermined low value is higher than the sum of the frequencies at tones not lower than the predetermined low value.

11. An apparatus as defined in claim 10 in which the reference binary-coding threshold value calculating means is provided with a determining means which determines whether the frequency at the peak tone is lower than the predetermined level, whether the sum of the frequencies at tones higher than a predetermined high value is higher than the sum of the frequencies at tones not higher than the predetermined high value, and whether at least one of the peak tone, the first tone and the reference binary-coding threshold value is higher than the predetermined high value, and sets the reference binary-coding threshold value to a predetermined tone when the determining means determines that the frequency at the peak tone is lower than the predetermined level, that the sum of the frequencies at tones lower than a predetermined high value is higher than the sum of the frequencies at tones not lower than the predetermined high value, or that at least one of the peak tone, the first tone and the reference binary-coding threshold value is higher than the predetermined high value.

12. An apparatus as defined in claim 8 in which the reference binary-coding threshold value calculating means is provided with a determining means which determines whether the frequency at the peak tone is lower than the predetermined level, whether the sum of the frequencies at tones higher than a predetermined high value is higher than the sum of the frequencies at tones not higher than the predetermined high value, and whether at least one of the peak tone, the first tone and the reference binary-coding threshold value is higher than the predetermined high value, and sets the reference binary-coding threshold value to a predetermined tone when the determining means determines that the frequency at the peak tone is lower than the predetermined level, that the sum of the frequencies at tones lower than a predetermined high value is higher than the sum of the frequencies at tones not lower than the predetermined high value, or that at least one of the peak tone, the first tone and the reference binary-coding threshold value is higher than the predetermined high value.

13. The method of claim 1, wherein a value of a peak tone is determined by selecting a tone located at the mid point of a predetermined tone band within the histogram.

14. The apparatus of claim 7, wherein a value of a peak tone is determined by selecting a tone located at the mid point of a predetermined tone band within the histogram.

* * * * *